US 9,136,912 B2

United States Patent
West et al.

(10) Patent No.: US 9,136,912 B2
(45) Date of Patent: Sep. 15, 2015

(54) TRANSMISSION LINES APPLIED TO CONTACT FREE SLIP RINGS

(75) Inventors: Joseph Newhall West, Petaluma, CA (US); Jon Robert Kiser, San Francisco, CA (US); Jerry Samuel Dimsdale, Oakland, CA (US)

(73) Assignee: Voxis, Inc., Oakland, NJ (US)

( * ) Notice: Subject to any disclaimer, the term of this patent is extended or adjusted under 35 U.S.C. 154(b) by 0 days.

(21) Appl. No.: 13/423,620

(22) Filed: Mar. 19, 2012

(65) Prior Publication Data

US 2012/0218061 A1 Aug. 30, 2012

Related U.S. Application Data (62) Division of application No. 12/212,284, filed on Sep. 17, 2008, now Pat. No. 8,138,849.

(60) Provisional application No. 60/994,564, filed on Sep. 20, 2007.

(51) Int. Cl.
| | |
|---|---|
| *H01P 1/06* | (2006.01) |
| *H04B 5/00* | (2006.01) |

(52) U.S. Cl.
CPC ........ *H04B 5/00* (2013.01); *H01P 1/068* (2013.01); *H04B 5/0037* (2013.01); *H04B 5/0087* (2013.01)

(58) Field of Classification Search
CPC ........... H01P 5/12; H01P 1/062; H01P 1/064; H01P 1/068; H01P 1/069
USPC .......... 333/24 C, 24 R, 27, 33, 238, 257, 261, 333/260; 385/26, 139; 455/269, 270, 455/272–274, 281, 282, 292, 320
See application file for complete search history.

(56) References Cited

U.S. PATENT DOCUMENTS

| | | | |
|---|---|---|---|
| 2,602,118 A | 7/1952 | Adams et al. | |
| 3,423,991 A | 1/1969 | Collins | |

(Continued)

FOREIGN PATENT DOCUMENTS

| | | | |
|---|---|---|---|
| JP | H08224233 A | 9/1996 | |
| JP | H11298210 A | 10/1999 | |

(Continued)

OTHER PUBLICATIONS

PCT International Search Report from PCT Patent Appln. No. PCT/US2008/010847; filed Sep. 18, 2008 (3 pgs).

(Continued)

*Primary Examiner* — Robert Pascal
*Assistant Examiner* — Gerald Stevens
(74) *Attorney, Agent, or Firm* — Chiesa Shahinian & Giantomasi PC (57) ABSTRACT

A non-contacting rotary interface has a first core with a first pair of balanced transmission lines coupled to the first core and a second core moveable in relation to the first core with a second pair of balanced transmission lines coupled to the second core and configured to receive signals from the first pair of balanced transmission lines. The first pair of balanced transmission lines has a first transmit wire coupled to a termination point at a first end of the first transmit wire, a first transmitter coupled to the first transmit wire at a second end of the first transmit wire, a second transmit wire coupled to the termination point at a first end of the second transmit wire, and a second transmitter coupled to the second transmit wire at a second end of the second transmit wire. The balanced transmission lines may be electrical traces on a circuit board.

10 Claims, 6 Drawing Sheets

(56) References Cited

U.S. PATENT DOCUMENTS

| | | | |
|---|---|---|---|
| 4,730,224 A * | 3/1988 | Komatsu | 360/64 |
| 5,126,704 A * | 6/1992 | Dittmer et al. | 333/125 |
| 5,157,393 A * | 10/1992 | Fox et al. | 340/870.3 |
| 5,530,422 A | 6/1996 | Harrison | |
| 5,577,026 A * | 11/1996 | Gordon et al. | 370/278 |
| 5,892,411 A * | 4/1999 | Schwan et al. | 333/24 R |
| 6,452,688 B1 | 9/2002 | Suzuki | |
| 6,630,993 B1 | 10/2003 | Hedges et al. | |
| 6,864,759 B2 | 3/2005 | Lonsdale et al. | |
| 6,870,608 B2 | 3/2005 | Detweiler et al. | |
| 6,985,046 B2 | 1/2006 | Schilling | |
| 7,187,823 B2 | 3/2007 | Dimsdale et al. | |
| 2004/0160286 A1 * | 8/2004 | Ward et al. | 331/185 |
| 2005/0279914 A1 * | 12/2005 | Dimsdale et al. | 250/205 |
| 2007/0037516 A1 | 2/2007 | Sawai et al. | |

FOREIGN PATENT DOCUMENTS

| | | |
|---|---|---|
| JP | 2002050531 A | 2/2002 |
| JP | 2007049422 A | 2/2007 |
| WO | 9629708 | 9/1996 |

OTHER PUBLICATIONS

PCT Written Opinion from PCT Patent Appln. No. PCT/US2008/010847; filed Sep. 18, 2008 (7 pgs).

* cited by examiner

TRANSMISSION LINES APPLIED TO CONTACT FREE SLIP RINGS

This application is a divisional of U.S. patent application Ser. No. 12/212,284, filed Sep. 17, 2008, which claims the benefit of U.S. Provisional Application No. 60/994,564 filed Sep. 20, 2007, both of which is are incorporated herein by reference.

BACKGROUND OF THE INVENTION

The present invention relates generally to signal transmission in non-contacting interfaces and more particularly to power and information transfer in non-contacting interfaces.

Many systems require power and/or information to be transferred between surfaces in motion, such as between rotating surfaces. Generally, this is accomplished using contacting or non-contacting slip rings (e.g., rotary transformers, rotary electrical interfaces, rotating electrical connectors, collectors, swivels, electrical rotary joints, etc.). The slip ring system couples electrical signals between two portions of the slip ring that rotate in relation to each other.

A contact-type slip ring generally consists of a conductive circle or band mounted on a shaft and insulated from it. The rotating portion of the system, such as the rotor of a generator, is electrically connected to the conductive circle. Fixed contacts or brushes run in contact with the conductive circle, transferring electrical power or signals to the static portion of the system.

Contact-type slip rings have numerous disadvantages including mechanical failure, sparking, noise introduction, limited power and/or data rate transfer capability, etc. Non-contacting slip rings have been employed to overcome some of the disadvantages introduced by contact-type slip ring systems.

Non-contacting slip ring systems have employed various means for transmitting information across a small gap between the rotating and the non-rotating portions of the slip ring systems. For example, U.S. Pat. No. 6,452,668, entitled "Rotating head optical transmitter for position measurement system," U.S. Pat. No. 6,630,993, entitled "Method and optical receiver with easy setup means for use in position measurement systems," U.S. Pat. No. 6,870,608, entitled "Versatile transmitter and receiver for position measurement," and U.S. Pat. No. 7,187,823, entitled "Contact-free slip ring for survey instrumentation" describe various uses of optical transmitters to transmit information across an air gap between the rotating and the non-rotating portions of the slip ring systems. Such systems require highly precise alignment (e.g., micron level alignment) to ensure proper signal transmission. These systems therefore require manufacturing and alignment tolerances that are difficult to achieve in order to function properly.

Accordingly, improved systems and methods for data and/or power transmission in contact free slip rings are required.

BRIEF SUMMARY OF THE INVENTION

The present invention generally provides for transmission of information in non-contacting rotary interfaces. In one embodiment, a non-contacting rotary interface has a first core with a first pair of balanced transmission lines coupled to the first core and a second core moveable in relation to the first core with a second pair of balanced transmission lines coupled to the second core and configured to receive signals from the first pair of balanced transmission lines. The first pair of balanced transmission lines has a first transmit wire coupled to a first transmitter at a first end of the first transmit wire, a second transmitter coupled to the first transmit wire at a second end of the first transmit wire, a second transmit wire coupled to a third transmitter at a first end of the second transmit wire, and a fourth transmitter coupled to the second transmit wire at a second end of the second transmit wire. In some embodiments, the balanced transmission lines are electrical traces on a circuit board.

These and other advantages of the invention will be apparent to those of ordinary skill in the art by reference to the following detailed description and the accompanying drawings.

DETAILED DESCRIPTION

At least one embodiment of the present invention provides a rotary interface utilizing transmission lines to transmit information across a gap between a rotating and a non-rotating portion of the interface. Though described herein in terms of the exemplary embodiments shown in FIGS. 1-4 and FIG. 8, any appropriate layout or implementation of a rotary interface (e.g., contract free slip ring, etc.) may be used. For descriptive simplicity and clarity, rotary interfaces similar to a rotor-stator interface or a rotary transformer are described below. The various aspects and components of a generic rotary interface are not described in detail herein except as necessary to describe the present invention. One of skill in the art will recognize the various components and their uses that are omitted or briefly mentioned.

Figure 1:
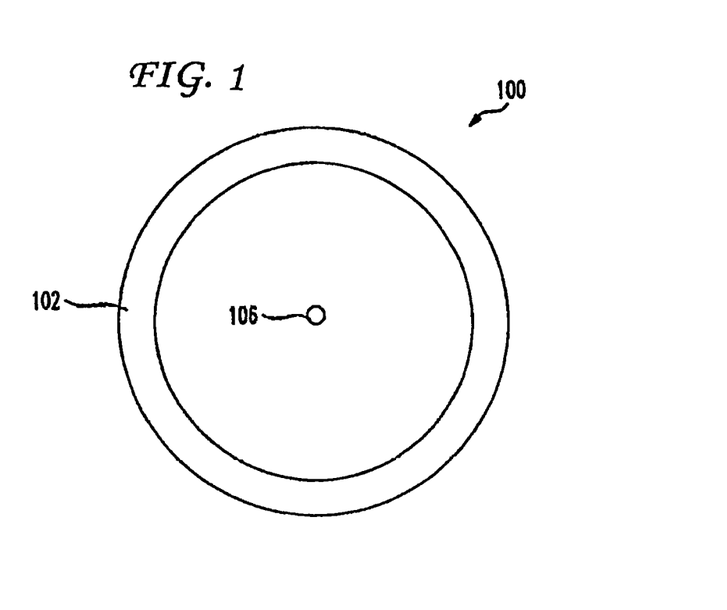
FIG. 1 depicts a top view of a rotary interface according to an embodiment of the present invention.

FIG. 1 depicts a top view of a rotary interface 100 according to an embodiment of the present invention. In at least one embodiment, rotary interface 100 comprises two substantially similar cores—a top core 102 and a bottom core 104 (shown in FIG. 3). In some embodiments, one or both of top core 102 and bottom core 104 are arranged in rotatable relation to each other. That is, either or both of top core 102 and bottom core 104 may be rotated around central axis 106.

Figure 2:
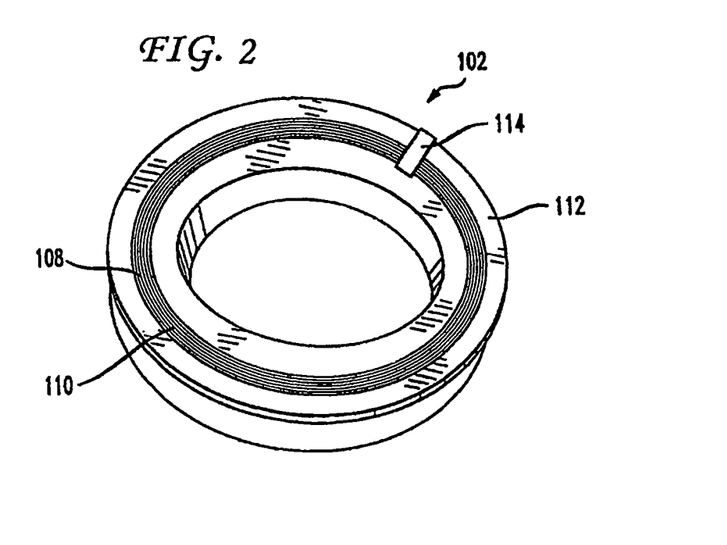
FIG. 2 depicts a bottom-side perspective view of a rotary interface top core.

FIG. 2 depicts a bottom-side perspective view of the rotary interface 100 top core 102. Top core 102 may be a substantially similar but inverted core with similar components and features to bottom core 104 as described in further detail below with respect to FIGS. 3-7. Top core 102 may include a windings channel 108 that houses windings 110. In some embodiments, top core 102 may also include a trace path 112 and/or an electronics channel 114.

Figure 3:
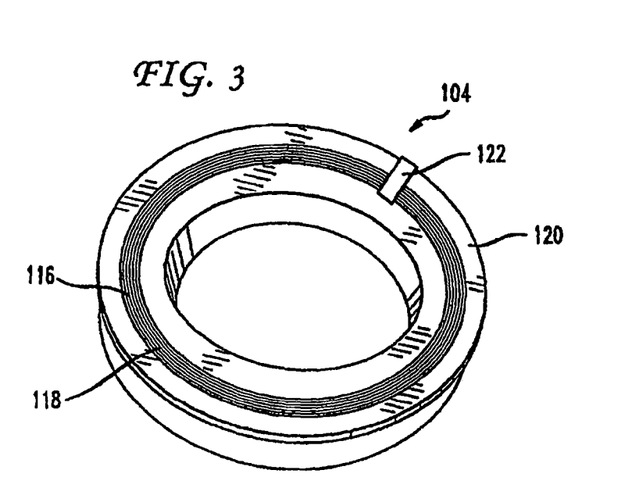
FIG. 3 depicts a top-side perspective view of a rotary interface bottom core.

Similarly, FIG. 3 depicts a top-side perspective view of the rotary interface 100 bottom core 104. Bottom core 104 may be a substantially similar but inverted core with similar components and features to top core 102 as described above and in further detail below with respect to FIGS. 4-7. Bottom core 104 may include a windings channel 116 that houses windings 118, similar to windings channel 108 and windings 110 of top core 102. In some embodiments, bottom core 104 may also include a trace path 120 and/or an electronics channel 122 similar to trace path 112 and/or an electronics channel 114.

Figure 4:
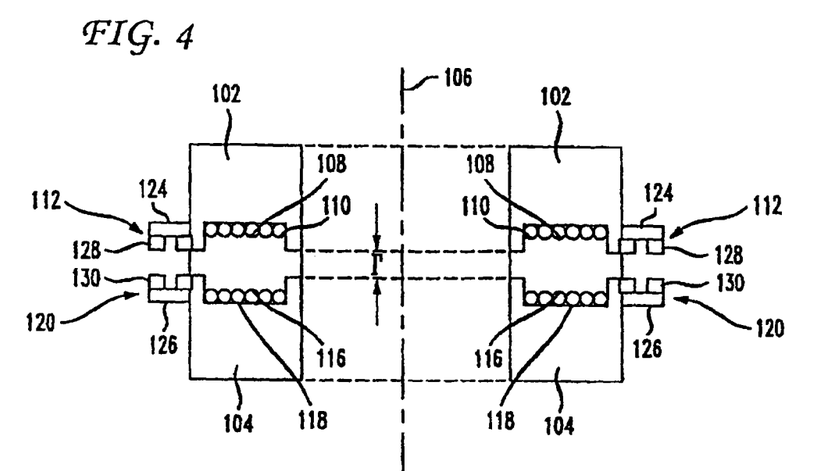
FIG. 4 depicts a side cross-sectional view of a rotary interface according to an embodiment of the present invention.

FIG. 4 depicts a side cross-sectional view of rotary interface 100 according to an embodiment of the present invention. As discussed above, rotary interface 100 includes a top core 102 and a bottom core 104, each with respective windings channels 108 and 116 and windings 110 and 118. Top core 102 and bottom core 104 may be non-contacting. That is, top core 102 and bottom core 104 may be spaced apart by a distance D. Distance D may be a non-constant distance. That is, some portions of top core 102 may be closer to bottom core 104 than other portions as top core 102 and/or bottom core 104 rotate about central axis 106.

In at least one embodiment, trace paths 112 and 120 may be implemented as including trace boards 124 and 126, each having respective transmission lines 128 and 130 (e.g., line traces printed on a circuit board, etc.). In the same or alternative embodiments, trace paths 112 and 120, trace boards 124 and 126, and/or transmission lined 128 and 130 may be located in or about windings channels 108 and 116 or on any other appropriate portion of top core 102 and bottom core 104.

Top core 102 and bottom core 104 may be substantially ring-shaped cores formed of any appropriate material (e.g., ferrite, etc.) positioned adjacent each other, but spaced apart by the distance D. This distance may be predetermined and may be any suitable distance such that, subject to manufacturing tolerances of top core 102 and bottom core 104, the cores 102, 104 will not contact each other when one or both are rotated about central axis 106. In at least one embodiment, the distance D may be approximately 5/1000 inches. As will be discussed below, because transmission lines 128, 130 are employed, top core 102 and bottom core 104 require less stringent alignment than conventional non-contacting slip rings and thus the distance D may be a non-constant distance. That is, even if top core 102 and/or bottom core 104 are irregularly shaped and/or are misaligned relative to each other, use of transmission lines 128 and 130 negates the need for highly accurate alignment.

Windings 110 and 118 may be magnetically coupled wire coils aligned in windings channels 108 and 116, respectively, and may be substantially symmetric about central axis 106. In this way, rotary interface 100 includes a pair of substantially identical ring-shaped cores 102, 104 for housing windings 110, 118 capable of inductively coupling power therebetween. The windings 110 and 118 in each respective core 102 and 104 may have a predetermined number of wrapped wires or a number of wrappings of a single wire. The number of wires and/or wrappings may depend upon the gauge of the wire used. Each wrapped wire of a winding 110, 118 can have first and second ends connected to a component such as a transmitter, receiver, or rectifier through electronics channels 114 and/or 122 as discussed below with respect to FIGS. 5-7. In such embodiments of rotary interface 100, magnetic flux provides coupling from top core 102 to bottom core 104 and/or from bottom core 104 to top core 102. In other words, mutual inductance is provided between top core 102 and bottom core 104 that couples energy across distance D in rotary interface 100.

Power can be applied to, for example, winding 118 mounted inside a ferrite bottom core 104. The magnetic field lines can pass largely through the low reluctance path of the ferrite material into the matching top core 102 through the gap between the cores (e.g., distance D). A voltage may be induced in the winding 110 mounted in the top core 102, allowing power to be transferred between the windings 110, 118 of the cores 102, 104. In a similar way, power can be applied to, for example, winding 110 mounted inside a ferrite top core 102. The magnetic field lines can pass largely through the low reluctance path of the ferrite material into the matching bottom core 104 through the gap between the cores (e.g., distance D). A voltage may be induced in the winding 118 mounted in the bottom core 104, allowing power to be transferred between the windings 110, 118 of the cores 102, 104.

In the same or alternative embodiments, such a rotary interface 100 may be used to couple AC electrical power between components, such as by passing power between a first set and a second set of power electronics (not shown), where one set of power electronics is capable of rotating relative to the other set of power electronics. The electrical power coupling can be provided by the inductive energy transfer capability of the rotary interface 100. Unlike conventional contacting slip rings, this rotary interface 100 does not make mechanical contact between the top core 102 and the bottom core 104. Thus, problems with contacting slip rings, such as intermittent contact and sparking, can be avoided.

Transmission lines 128 and 130 may be implemented using any appropriate means for directing the transmission of energy, such as electromagnetic waves or acoustic waves, as well as electric power transmission. For example, transmission lines 128 and 130 may be transmission line traces printed on a circuit board such as respective trace boards 124 and 126, or may be wires, coaxial cables, dielectric slabs, optical fibers, electric power lines, waveguides, or the like. In at least one embodiment, transmission lines 128 and 130 are traces printed on FR-4 printed circuit boards (PCBs). Of course, other appropriate PCBs may be used.

Transmission lines 128 and 130 may be used to allow electrical signals to be passed between top core 102 and bottom core 104. Though expressed herein as transmission lines 128 and 130, one of skill in the art will recognize that multiple transmission lines may be used in each core 102, 104. That is, transmission lines 128 and 130 may each include one or more pairs of transmission lines. For example, transmission lines 128 and 130 may include pairs of transmission lines for each direction of communication (e.g., a pair for transmitting from top core 102 to bottom core 104 and/or a pair for transmitting from bottom core 104 to top core 102). Transmission line pairs may be electrically driven and thus used as a transmitter (e.g., may be configured to transmit a signal). In reciprocal fashion, a transmission line pair may be used as a receiver. Generally, as discussed below, transmission lines have controlled impedance along their length and are terminated with a similar matched impedance.

In at least one embodiment, transmission lines 128 and 130 may be transmission line pairs that include two conductors of the same type with equal impedance to ground and other circuits. Since transmission line traces may be relatively small, multiple pairs of transmission and/or reception transmission lines may be used in rotary interface 100. Since the transmission lines may be used as a transmission line in one core "coupled" to a receiving transmission line in another core, the transmission lines may be in close proximity to each other across the distance D regardless of the angular position of top core 102 relative to bottom core 104.

Figure 5:
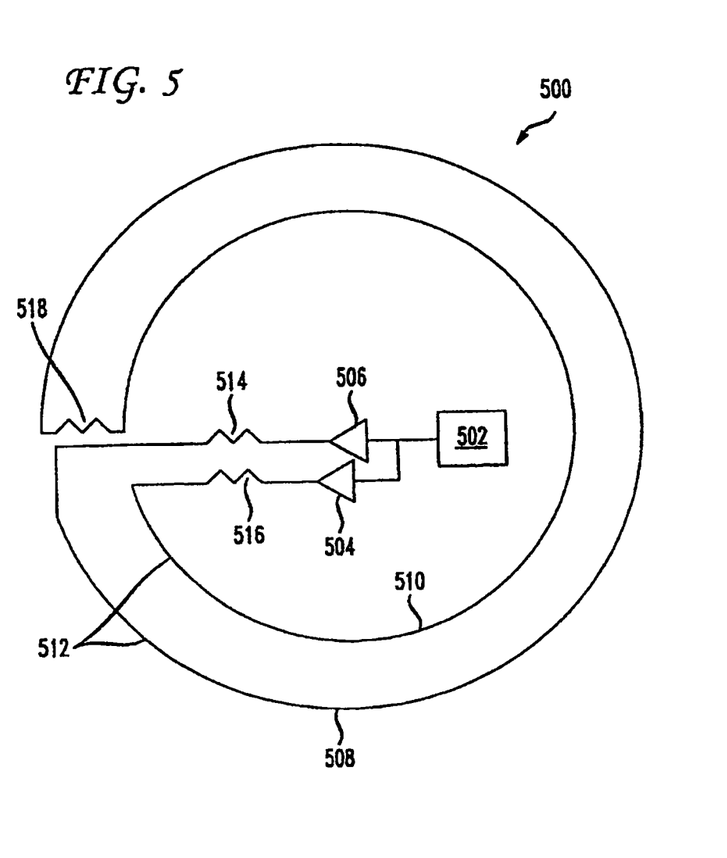
FIG. 5 depicts a single-ended balanced transmission line transmitter according to an embodiment of the present invention.
Figure 6:
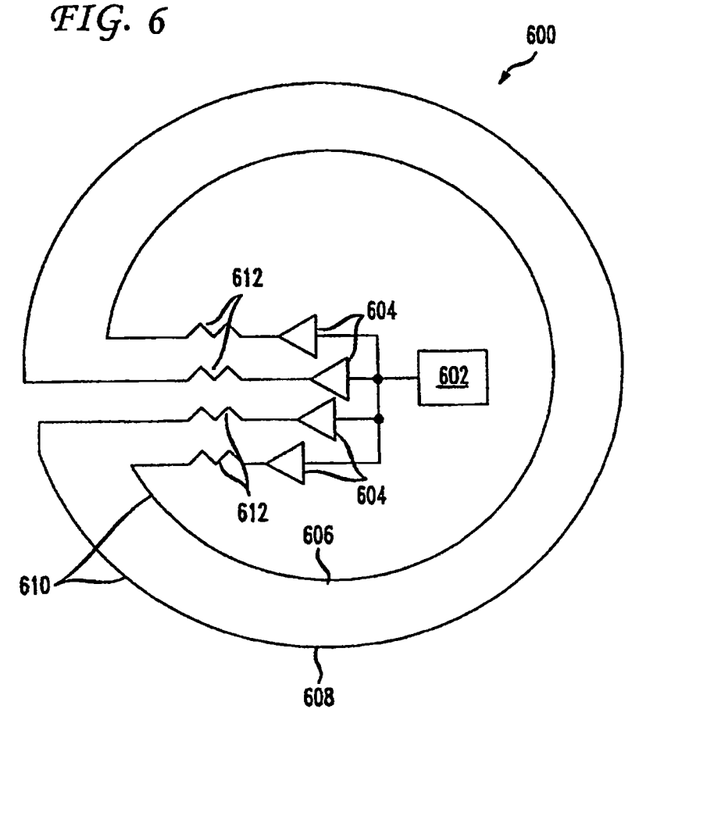
FIG. 6 depicts a balanced transmission line transmitter according to an embodiment of the present invention.
Figure 7:
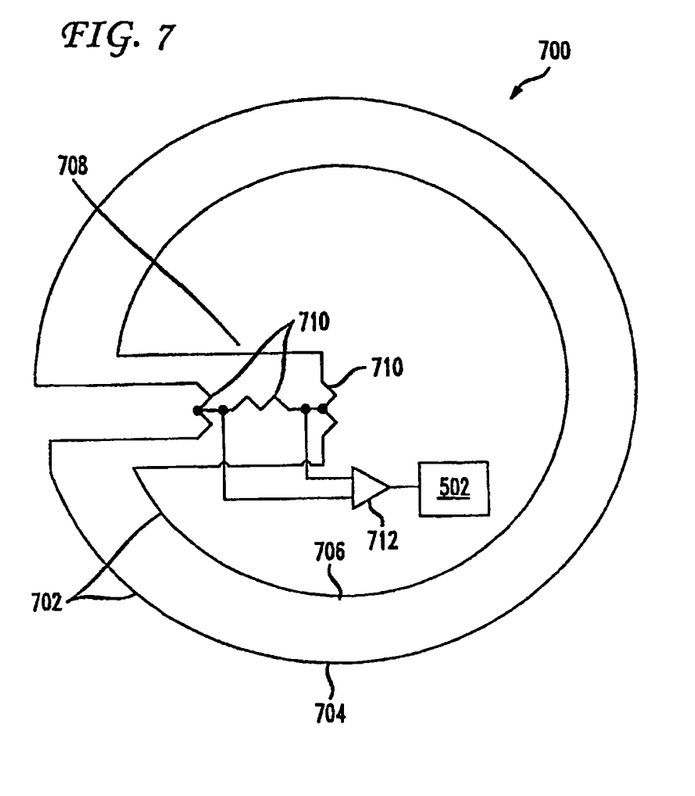
FIG. 7 depicts a transmission line receiver according to an embodiment of the present invention.

FIGS. 5-7 depict various embodiments of transmission using transmission lines in a rotary interface, such as the rotary interface 100 described above with respect to FIGS. 1-4 and the rotary interface 800 described below with respect to FIG. 8. As is shown below, single-ended and/or differential signaling may be used across transmission lines and/or pairs of transmission lines. This provides improvement over conventional methods of signal transmission across an air gap in rotary interfaces because the transmission lines do not require highly rigorous alignment as is needed in prior methods, such as optical transmission. Generally, transmission lines used in the inventive manner take advantage of certain aspects of transmission lines usually considered to be disadvantages. Specifically, transmission lines are used in the present invention in close proximity to other transmission lines. Communication therebetween is normally considered a deleterious effect and provisions are made to shield the resultant "cross-talk" (e.g., interference between transmission lines). However, in the present invention, this "cross-talk" is used to transmit information in an unconventional manner.

FIG. 5 depicts a single-ended balanced transmission line transmitter 500 according to an embodiment of the present invention. Transmitter 500 may be implemented as part of rotary interface 100 described above. For example, transmitter 500 may be used as a transmission line 128 in top core 102 and/or transmission line 130 in bottom core 104.

Transmitter 500 includes a signal transmitter 502 coupled to a pair of transmitters 504 and 506. Transmitters 504 and 506 are, in turn, coupled to a first line 508 (e.g., wire, etc.) and a second line 510 (e.g., wire, etc.) of a transmission line 512. In some embodiments, first line 508 and second line 510 are coupled to transmitters 504 and 506 through resistors 514 and 516. Transmission line 512 is terminated at a terminating resistor 518.

Transmitter 500 may be configured to transmit any appropriate signal, such as complementary signals along first line 508 and second line 510. Transmitters 504 and 506 may be used to amplify signals from signal transmitter 502 and to drive the transmission line 512 impedance at all times. A signal transmitted using single-ended balanced transmitter 500 may be received by any appropriate transmission line receiver, such as receiver 700 described below with respect to FIG. 7.

FIG. 6 depicts a balanced transmission line transmitter 600 according to an embodiment of the present invention. Transmitter 600 may be implemented as part of rotary interface 100 described above with respect to FIGS. 1-4 and/or a rotary interface 800 described below with respect to FIG. 8. For example, transmitter 600 may be used as a transmission line 128 in top core 102 and/or transmission line 130 in bottom core 104.

Transmitter 600 includes a signal transmitter 602 coupled to multiple transceivers transmitters 604. Transmitters 604 are, in turn, coupled to a first line 606 (e.g., wire, etc.) and a second line 608 (e.g., wire, etc.) of a transmission line 610 (e.g., as a differential pair, etc.). In some embodiments, first line 606 and second line 608 are coupled to transmitters 604 through resistors 612.

Transmitter 600 may be configured to transmit any appropriate signal, such as complementary signals sent to both ends of both first line 606 and second line 608. Transmitters 604 may be used to amplify signals from signal transmitter 602 and to assist in propagating the signal around transmission line 610. A signal transmitted using balanced transmission line transmitter 600 may be received by any appropriate transmission line receiver, such as receiver 700 described below with respect to FIG. 7.

FIG. 7 depicts a transmission line receiver 700 according to an embodiment of the present invention. As discussed generally above, transmission line receiver 700 may be positioned proximal a transmission line transmitter (e.g., single-ended balanced transmission line transmitter 500, balanced transmission line transmitter 600, etc.) and signals may be passed therebetween. That is, a transmitting transmission line located in a core (e.g., top core 102 or bottom core 104) may transmit signals across an air gap (e.g., distance D, etc.) to transmission line receiver 700, which is located in an opposing (e.g., facing) core. Due to the nature of the "cross-talk" between the transmitting transmission line transmitter 500/600 and the receiving transmission line receiver 700, the transmission lines 500/600 and 700 may be near (e.g., within less than 200 microns) to each other, but do not require stringent angular alignment.

Exemplary transmission line receiver 700 comprises a transmission line 702. In at least one embodiment, transmission line 702 is a transmission line pair having a first line 704 (e.g., wire, etc.) and a second line 706 (e.g., wire, etc.). Transmission line 702, through first line 704 and second line 706, terminates in a balanced termination 708. Balanced termination 708 may comprise one or more resistors 710 with a matched impedance. A signal received by transmission line receiver 700 over transmission line 702 may be passed through balanced termination 708 to a differential receiver 712 to boost the incoming signal and reduce noise of common-mode interference.

In at least one embodiment, balanced termination 708 may have approximately 2 dB of transmission loss to control output ringing due to induced counter rotating signals through transmission line 702. In the same or alternative embodiments, the differential receiver will have some hysteresis and high gain. With some link geometries, the coupling between the transmission lines could be somewhat weak; in that case, it will be advantageous to include significant gain in the receiver and provide some receiver hysteresis to reject noise. At transitions of a signal from transmission line transmitter 500/600, there will be a change in current flowing in the transmission line transmitter, and this will induce a change in current flowing in the receiving transmission line; thus resulting in a portion of the signal associated with that single transition being transferred across the air gap to the transmission line receiver 700. As all the signal transitions are transferred across the gap, the entire signal can be reconstructed at the output of the receiver. Of course, any appropriate implementation of transmission lines as a receiver may be used as transmission line receiver 700 in coordination with the various embodiments of the invention described above.

Figure 8:
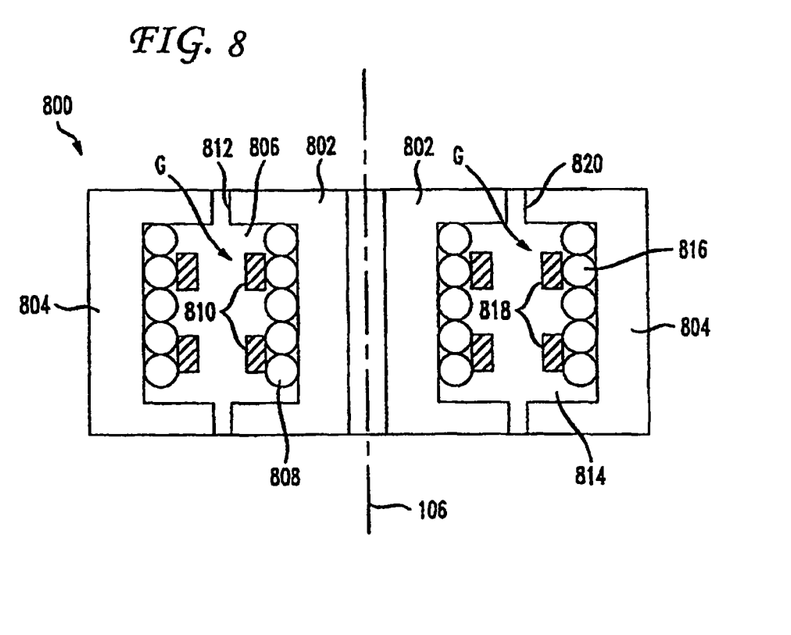
FIG. 8 shows a rotary interface that can be used to provide coupling and isolation according to an embodiment of the present invention.

Other substantially radial symmetric arrangements of a rotary interface can be used to provide similar coupling and isolation, such as the rotary interface 800 shown in FIG. 8. In contrast to the top core 102 and bottom core 104 rotary interface 100 separated by a distance D described above with respect to FIGS. 1-4, rotary interface 800 includes an inner concentric cylinder 802 and an outer concentric cylinder 804 separated by a tubular gap G. Both inner cylinder 802 and outer cylinder 804 may rotate about central axis 106. In operation, this may be similar to top core 102 and bottom core 104 as described above, but modified to accommodate the concentric arrangement of cylinders 802 and 804. For example, inner cylinder 802 may have a windings channel 806 for housing windings 808 and/or transmission lines 810. In an alternative embodiment, one or both of windings 808 and/or transmission lines 810 may be mounted in another location on or about inner cylinder 802, such as on an outer edge 812. Similarly, outer cylinder 804 may have a windings channel 814 for housing windings 816 and/or transmission lines 818. In an alternative embodiment, one or both of windings 816 and/or transmission lines 818 may be mounted in another location on or about outer cylinder 804, such as on an inner edge 820. Transmission lines 810 and 818 may be used as transmitters and/or receivers as described generally above with respect to FIGS. 1-4 and specifically with respect to FIGS. 5-7.

Figure 9:
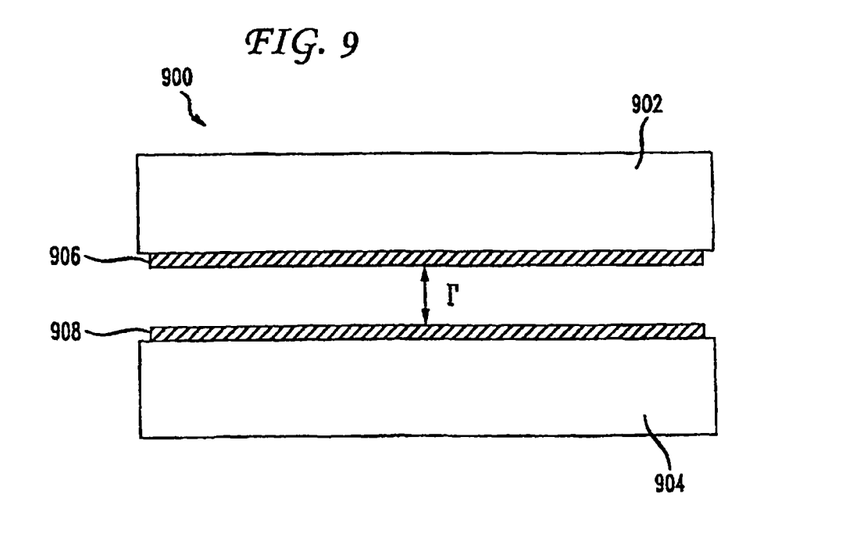
FIG. 9 depicts a top view of a non-contacting interface according to an embodiment of the present invention.

Of course, the use of transmission lines to transmit information across an air gap may be extended to other non-rotary moving interfaces. For example, transmission lines could be mounted to two lateral members spaced apart by a small distance as shown in FIG. 9. Information may be passed therebetween as one or both of the lateral members are moved longitudinally and/or lattitudinally relative to each other.

Specifically, FIG. 9 depicts a top view of a non-contacting interface 900 according to an embodiment of the present invention. Non-contacting interface 900 includes a first member 902 spaced apart from a second member 904. That is, as similarly discussed above with respect to cores 102 and 104 of rotary interface 100, first member 902 is separated from second member 904 by a gap of distance D. First member 902 has a first transmission line 906 coupled to a portion of the member. Similarly, second member 904 has a second transmission line 908 coupled to a portion of the member. As will be understood by one of skill in the art, the transmission lines 906 and 908 may be affixed to, embedded in, or otherwise associated with their respective members. In at least one embodiment, transmission lines 906 and 908 are coupled to facing surfaces of members 902 and 904.

Members 902 and 904 may be formed of any appropriate material. In at least one embodiment, members 902 and 904 may be separate apparatuses in a system that must communicate with each other. Transmission lines 906 and 908 may be transmission lines as described above with respect to FIGS. 5-7. In at least one embodiment, transmission lines 906 and 908 may be similar to transmitting transmission lines and receiving transmission lines discussed above, but may be aligned substantially longitudinally along respective members 902 and 904. In the same or alternative embodiments, transmission lines 906 and 908 may be electrical traces on one or more circuit boards as described above.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A non-contacting rotary interface comprising: a first ring-shaped core;
   a first pair of balanced transmission lines coupled to the first ring-shaped core via a first trace board attached to an outer surface of the first ring-shaped core;
   a second ring-shaped core rotatable in relation to the first ring-shaped core about a central axis, wherein:
   the first ring-shaped core and the second ring-shaped core are adjacent to each other and spaced apart by a distance, the first ring-shaped core and the second ring-shaped core having the same diameter, wherein the first ring-shaped core and the second ring-shaped core are spaced apart by the distance such that a first distance between at least one portion of the first ring-shaped core and at least one portion of the second ring-shaped core differs from a second distance between at least one other portion of the first ring-shaped core and at least one other portion of the second ring-shaped core, wherein the distance includes the first distance and the second distance; and
   a second pair of balanced transmission lines coupled to the second ring-shaped core via a second trace board attached to an outer surface of the second ring-shaped core, the second pair of balanced transmission lines configured to receive signals from the first pair of balanced transmission lines,
   wherein the first pair of balanced transmission lines is extended outward toward the second pair of balanced transmission lines for transmission of energy between the first ring-shaped core and the second ring-shaped core along the central axis;
   wherein the second pair of balanced transmission lines is extended outward toward the first pair of balanced transmission lines for transmission of said energy between the first ring-shaped core and the second ring-shaped core along the central axis;
   wherein the first pair of balanced transmission lines comprises:
      a first transmit wire coupled to a termination point at a first end of the first transmit wire;
      a first transmitter used to amplify said signals coupled to the first transmit wire at a second end of the first transmit wire;
      a second transmit wire coupled to the termination point at a first end of the second transmit wire; and
      a second transmitter used to amplify said signals coupled to the second transmit wire at a second end of the second transmit wire.

2. The non-contacting rotary interface of claim 1, wherein the termination point is a terminating resistor.

3. The non-contacting rotary interface of claim 1, further comprising a signal transmitter.

4. The non-contacting rotary interface of claim 3, wherein the first transmitter and the second transmitter amplify said signals received from the signal transmitter and drive an impedance of the first transmit wire and the second transmit wire.

5. The non-contacting rotary interface of claim 1, wherein:
   the first ring-shaped core comprises a first windings channel housing first windings different from the first pair of balanced transmission lines; and
   the second ring-shaped core comprises a second windings channel housing second windings different from the second pair of balanced transmission lines.

6. The non-contacting rotary interface of claim 1, wherein the first ring-shaped core rotates about the central axis.

7. A non-contacting interface comprising:
   a first ring-shaped member;
   a first transmission line coupled to the first ring-shaped member via a first trace board attached to an outer surface of the first ring-shaped member;
   a second ring-shaped core rotatable in relation to the first ring-shaped core about a central axis, wherein:

the first ring-shaped core and the second ring-shaped core are adjacent to each other and spaced apart by a distance, the first ring-shaped core and the second ring-shaped core having the same diameter, wherein the first ring-shaped core and the second ring-shaped core are spaced apart by the distance such that a first distance between at least one portion of the first ring-shaped core and at least one portion of the second ring-shaped core differs from a second distance between at least one other portion of the first ring-shaped core and at least one other portion of the second ring-shaped core, wherein the distance includes the first distance and the second distance; and a second transmission line coupled to the second ring-shaped member via a second trace board attached to an outer surface of the second ring-shaped member, the second transmission line configured to receive signals from the first transmission line, wherein the first transmission line is a first pair of balanced transmission lines and the second transmission line is a second pair of balanced transmission lines, wherein the first pair of balanced transmission lines is extended outward toward the second pair of balanced transmission lines for transmission of energy between the first ring-shaped core and the second ring-shaped core along the central axis;

wherein the second pair of balanced transmission lines is extended outward toward the first pair of balanced transmission lines for transmission of said energy between the first ring-shaped core and the second ring-shaped core along the central axis;

wherein the first pair of balanced transmission lines comprises:
  a first transmit wire coupled to a termination point at a first end of the first transmit wire;
  a first transmitter used to amplify said signals coupled to the first transmit wire at a second end of the first transmit wire;
  a second transmit wire coupled to the termination point at a first end of the second transmit wire; and
  a second transmitter used to amplify said signals coupled to the second transmit wire at a second end of the second transmit wire.

8. The non-contacting interface of claim 7, wherein the termination point is a terminating resistor.

9. The non-contacting interface of claim 7, further comprising a signal transmitter.

10. The non-contacting interface of claim 9, wherein the first transmitter and the second transmitter amplify said signals received from the signal transmitter and drive an impedance of the first transmit wire and the second transmit wire.

* * * * *